April 9, 1940.     C. W. MORRIS     2,196,269

SAFETY DEVICE FOR GUN MOUNTS

Filed Dec. 11, 1936     3 Sheets-Sheet 1

INVENTOR.
CHARLES W. MORRIS.
BY
ATTORNEYS.

INVENTOR.
CHARLES W. MORRIS.

April 9, 1940.   C. W. MORRIS   2,196,269
SAFETY DEVICE FOR GUN MOUNTS
Filed Dec. 11, 1936   3 Sheets-Sheet 3

INVENTOR.
CHARLES W. MORRIS.
BY
ATTORNEYS.

Patented Apr. 9, 1940

2,196,269

UNITED STATES PATENT OFFICE 2,196,269

SAFETY DEVICE FOR GUN MOUNTS

Charles W. Morris, Kenmore, N. Y., assignor to Curtiss-Wright Corporation, a corporation of New York Application December 11, 1936, Serial No. 115,301

4 Claims. (Cl. 89—37.5)

This invention relates to armament for aircraft, and is particularly concerned with improvements applicable to flexibly mounted aircraft machine guns.

In aircraft having a pilot's compartment and a gunner's compartment rearward thereof, it is conventional to provide a flexibly mounted machine gun in the rearward compartment capable of being aimed upwardly, rearwardly and laterally with respect to the aircraft, the mounting being so arranged that the gunner may quickly shift the gun to cover any aiming point within the field of fire. Since the gun is capable of being aimed rearwardly, at times certain parts of the aircraft on which the gun is mounted come within the line of fire, and obviously it is dangerous to have this condition exist, for the gunner might conceivably damage the structure of his own aircraft should he inadvertently fire the gun at such time. It is known that certain prior art devices have included a shielding arrangement to prevent the gun being aimed directly at parts of the airplane on which the gun is mounted, but these have several disadvantages, chief of which is that the gunner must move the gun around the profile of the restricted zone if, for instance, he should want to shift the aiming point from a zone to the left and rearward of the aircraft, to a zone to the right and rearward of an aircraft. This invention provides means for restricting firing of a flexibly mounted gun at parts of the aircraft in which it is mounted without, however, detracting from free movement of the gun throughout its entire field of fire.

An object of the invention is to provide means for preventing firing of a flexibly mounted machine gun in certain zones within its field of fire.

A further object is to provide means for locking the gun action from firing in certain positions to which a flexibly mounted gun is capable of movement.

A further object is to provide means for protecting parts of an aircraft against inadvertent gun fire by a gun mounted within the aircraft.

Another object is to provide positively operated mechanical means for holding a gun out of action when aimed at certain points.

A further object is to provide alternative electrical means to prevent such inadvertent gun fire.

Still another object is to provide means for preventing gun fire in certain restricted zones, and another object is to provide means, in connection with a flexibly mounted gun movable along a track, to prevent gun fire in certain restricted zones regardless of the position of the gun carriage along the track.

Further objects will be apparent from a reading of the annexed specification and claims, and from an examination of the drawings, in which similar numbers indicate similar parts, and in which:

Figure 1:
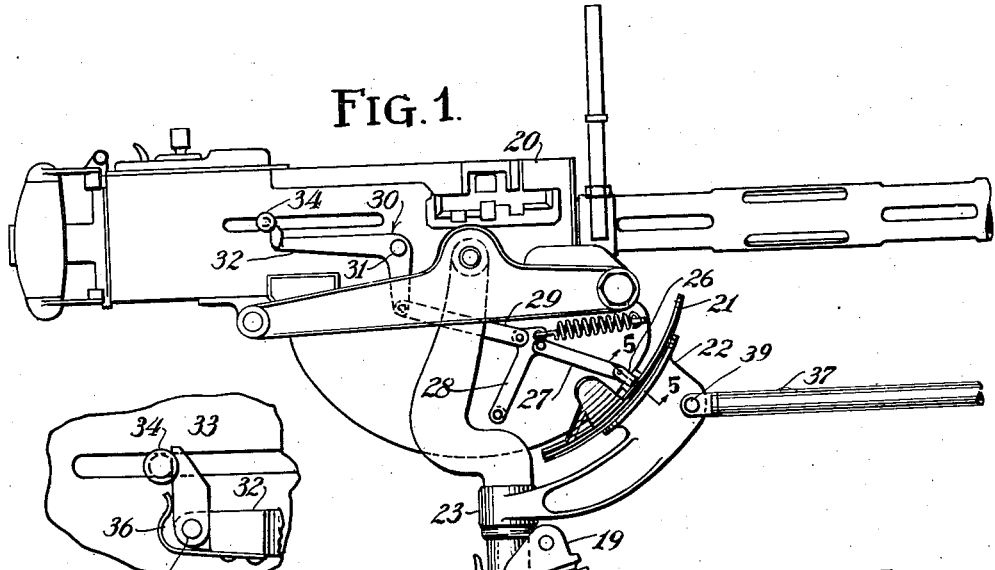
Fig. 1 is a side elevation of a flexibly mounted machine gun including one embodiment of the invention.
Figure 6:
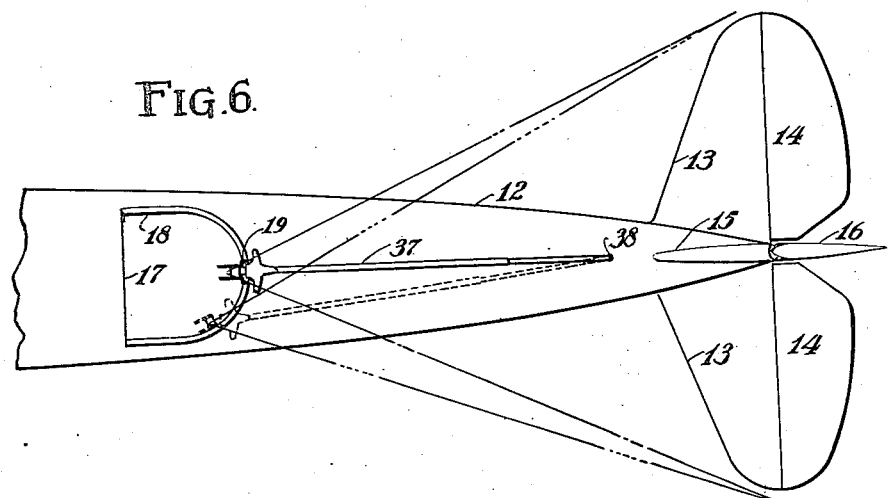
Fig. 6 is a diagrammatic plan of a portion of an aircraft embodying the features of the invention.

Referring to Fig. 6, an airplane fuselage 12 is shown as being conventionally equipped with horizontal stabilizers 13 having elevators 14 hinged thereto, and a vertical fin 15 having a rudder 16 hinged thereto. The fuselage 12 has a gunner's cockpit 17 provided with a track 18 throughout the length of which a gun carriage 19 may be moved. Since the gun mounted on the carriage 19—the gun being indicated in Fig. 1 as 20—may be flexibly moved vertically and horizontally with respect to the carriage, it is apparent that the field of fire will include the empennage comprising the elements 13 to 16, and ordinarily, the gunner must carefully avoid firing the gun if the latter is pointed at any of the elements of the empennage. To positively prevent the possibility of such damage, I provide a cam element 21 of spherical segmental form mounted upon a bracket 22 pivoted at 23 to the carriage 19. The cam 21 includes a vertical portion 24 aligned with the fin and rudder 15 and 16, and horizontally projecting portions 25 aligned with the stabilizers and elevators 13 and 14. The spherical segmental form of the cam 21 is so arranged that all portions of the cam plate are equidistant from the intersection of the traversing axis of the gun and the elevational axis of the gun, or, if these axes do not intersect, the form of the plate 21 may be compounded so that a cam engager 26, movable at all times with the gun, may contact with any portion of the cam.

Figure 3:
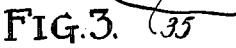
Fig. 3 is an enlarged fragmentary elevation of a detail of the invention.
Figure 4:
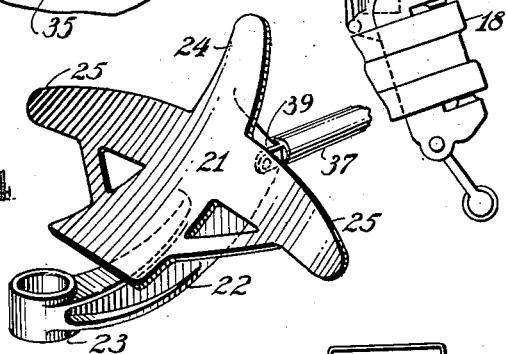
Fig. 4 is an enlarged perspective view of one of the elements of the invention.
Figure 5:
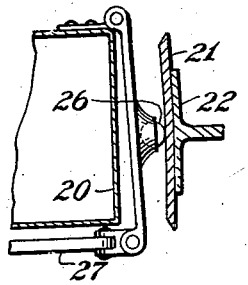
Fig. 5 is a fragmentary plan, in section, of certain elements of the invention.
Figure 2:
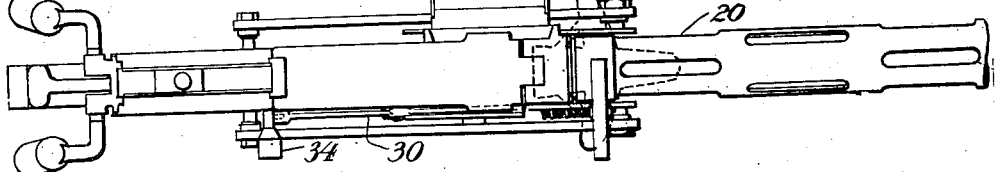
Fig. 2 is a plan of the gun of Fig. 1.

In the embodiment of Figs. 1 to 5, the cam engager 26 operates on a link system including elements 27, 28 and 29, the latter being pivoted to a bell crank 30 which in turn is pivoted to the gun at 31. A free arm 32 of the bell crank 30 is provided with a latch 33 engageable with the sliding charging handle 34 which is a normal part of the gun. This charging handle, as is well known in the art, reciprocates during automatic firing of the gun. If the handle is held from reciprocation, the gun may not fire. The linkage above described is so organized that when the cam follower 26 addresses the cam 21, the latch 33 will be raised to interfere with reciprocation of the handle 34. The latch, as shown in Fig. 3, is pivoted to the arm 32 at 35, and is provided with a spring 36 normally tending to keep the latch in a substantially vertical position. Should the arm 32 be raised during gun fire, the handle 34 will knock the latch 33 rearwardly against the spring as the handle moves rearwardly. As the handle moves forwardly to charge the gun, the latch 33 will have been raised, due to the spring 36, coming into the path of the handle 34 and preventing its complete forward movement to re-charge the gun.

If desired, the latch 33 might readily be placed close to the forward end of the slot in which the handle 34 slides, the latch being made rigid with the arm 32 and shaped to cam the handle 34 rearwardly should said raising have been initiated while the gun was not firing. Otherwise, the latch 33 would function as above described if the gun were firing. Ordinarily, in aircraft machine guns, slight rearward movement of the charging handle from its forwardmost position operates a disconnector within the gun action to prevent gun firing.

As indicated in Fig. 6, I have shown the track 18, along which the carriage 19 may be traversed. Since the track is curved, the cam 21 must be movable with respect to the carriage 19 so that it may at all times lie in a shielding relationship with respect to the aircraft empennage. This is readily accomplished by utilizing a telescoping tube 37 pivoted to the fuselage deck at 38 immediately forward of the leading edge of the fin 15. The forward end of the telescoping tube 37 is clevised to the bracket 22 at 39. Thereby, the cam 21 is at all times held in substantial alignment with the empennage to protect the latter, regardless of the carriage position.

Figure 7:
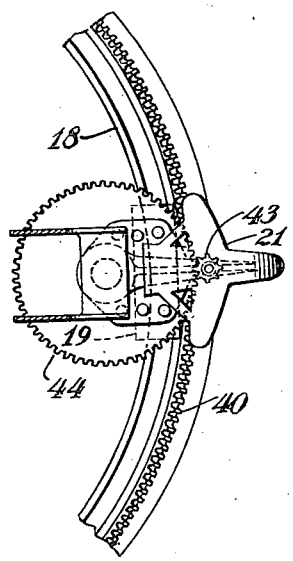
Fig. 7 is a partial plan of an alternative embodiment of the invention.
Figure 8:
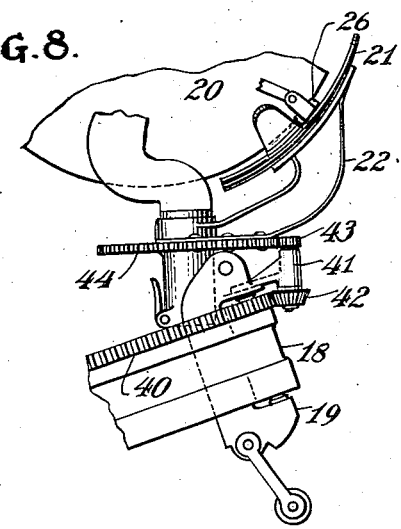
Fig. 8 is a fragmentary side elevation of a gun mount according to Fig. 7.

As an alternative mechanism for maintaining the cam 21 in alignment with the empennage in all positions of the carriage, a toothed rack 40 may border the track 18, as shown in Figs. 7 and 8. A carrier 41 is fixed to the carriage 19 and carries a pinion 42 engaged with the rack 40. A second pinion 43 is mounted to turn with the pinion 42 and engages a gear 44 fixed to the cam bracket 22. The ratios between the gears 40, 42, 43 and 44 are so chosen as to turn the bracket 22 to hold same in alignment with the aircraft empennage.

Figure 9:
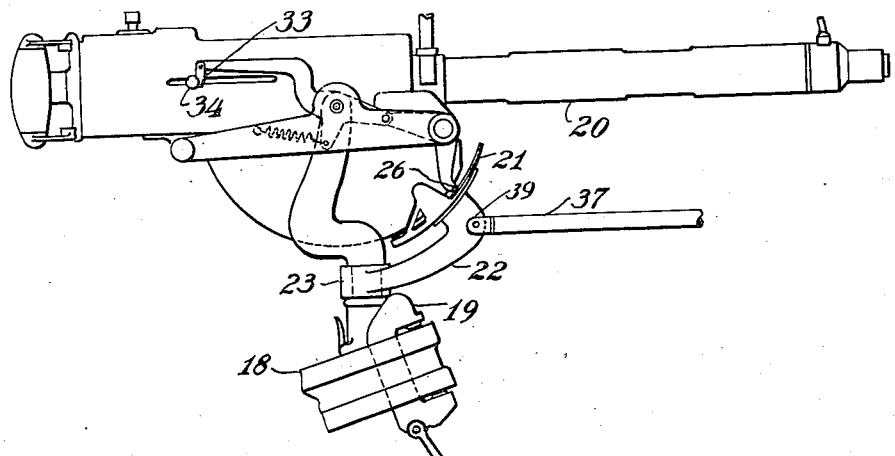
Figs. 9, 10 and 11 are side elevations, generally similar to the gun mount of Figs. 1 to 5, showing alternative arrangements of the invention.
Figure 10:
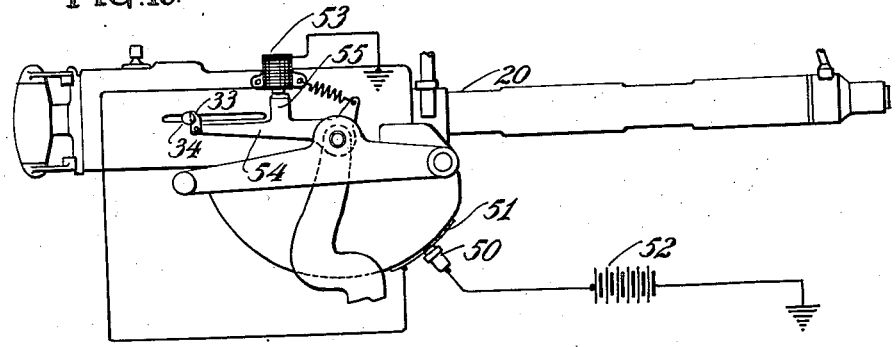
Figure 11:
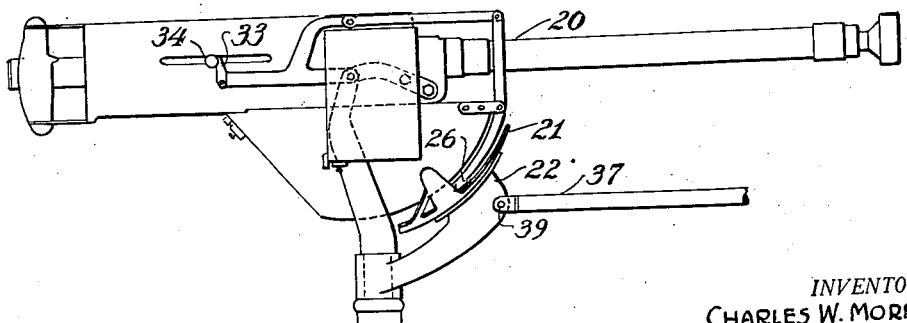

Figs. 9 and 11 show alternative linkage arrangements whereby the cam follower 26 is caused to actuate the latch 33 for holding the charging handle 34 in a position for preventing gun fire. In Fig. 10 I show an electrical system for preventing gun fire in restricted aiming zones, wherein the cam is replaced by a contact button 50. A contact plate 51 is fixed to the gun 20, this plate having a contacting surface of an appropriate form to make contact with the element 50 when the gun is aimed into the restricted zones. The elements 50 and 51 act as a switch, and the switch is in series with an electrical power source 52 and a solenoid 53. An arm 54, which carries the latch 34, is provided with an armature 55 adapted to be drawn toward the solenoid 53 when the latter is energized. Thereby, the latch 34 is brought into the path of travel of the gun handle 33 at any time that the members 50 and 51 make electrical contact.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft including a track mounted thereon, a carriage carried by and movable along said track, a gun flexibly mounted on said carriage for movement in traverse and elevation having a gunfire control member movable therewith, a shield movable with and with respect to said carriage with which said member is adapted to contact for gunfire control, a toothed rack on said track, a pinion on said shield, and epicyclic gearing carried by the carriage and establishing a driving connection from said rack to said pinion for controlling movement of said shield with respect to said carriage upon carriage movement along the track.

2. In an aircraft fuselage, an empennage, a gunner's cockpit forward thereof having an irregularly shaped track bordering its edge, a carriage movable along the track, a universally movable gun on the carriage, cam and cam-engaging means on the gun and loosely mounted on the carriage, one said means being shaped to conform to the empannage shape, a telescoping strut having one end secured to the carriage carried means for controlling its position relative to the carriage and having its other end pivoted to the fuselage adjacent the empennage, whereby upon carriage movement along the track said means is alined, by said strut, with the empennage, and means responsive to contact of said cam and cam-engaging means for locking said gun against firing.

3. In an aircraft fuselage, an empennage, a gunner's cockpit forward thereof having an irregularly shaped track bordering its edge, a carriage movable along said track, a gun carrying adapter freely swingable laterally on a substantially vertical axis and swivelly secured to said carriage, a shield element on the carriage freely and independently movable about said vertical axis, said shield having a contour similar in form to said empennage, means on the adapter-carried gun contactable with said shield and operative during such contact to lock the gun against firing, and guide mechanism secured at its operating termini to the shield and aircraft for holding the shield in alinement with the empennage in all positions of the carriage along said irregular track.

4. In aircraft, a protuberant fixed structure, a gunner's cockpit spaced therefrom having an irregularly shaped track bordering its edge, a carriage movable along said track, a gun adapter freely swingable laterally on a substantially vertical axis and swivelly secured to said carriage, a shield element on the carriage freely and independently movable about said vertical axis, said shield having a contour similar in form to said fixed protuberance, means on the adapter carried gun contactable with said shield and operative during such contact to lock the gun against firing, and guide mechanism secured at its operating termini to the shield and aircraft for holding the shield in alinement with said protuberance in all positions of the carriage along said irregular track.

CHARLES W. MORRIS.